Sept. 21, 1965  J. A. TOOMEY ETAL  3,206,763
COLLAR AND METHOD OF MAKING THE SAME
Filed Nov. 22, 1963
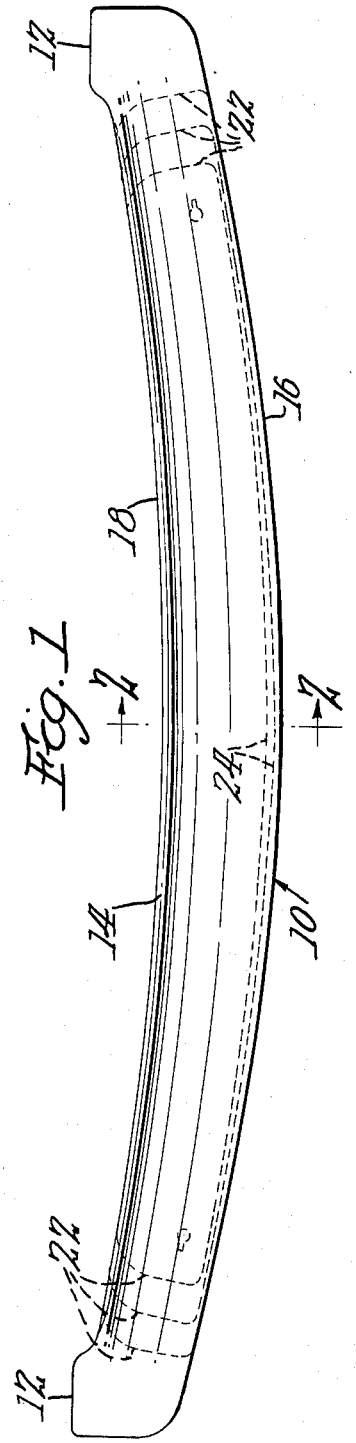
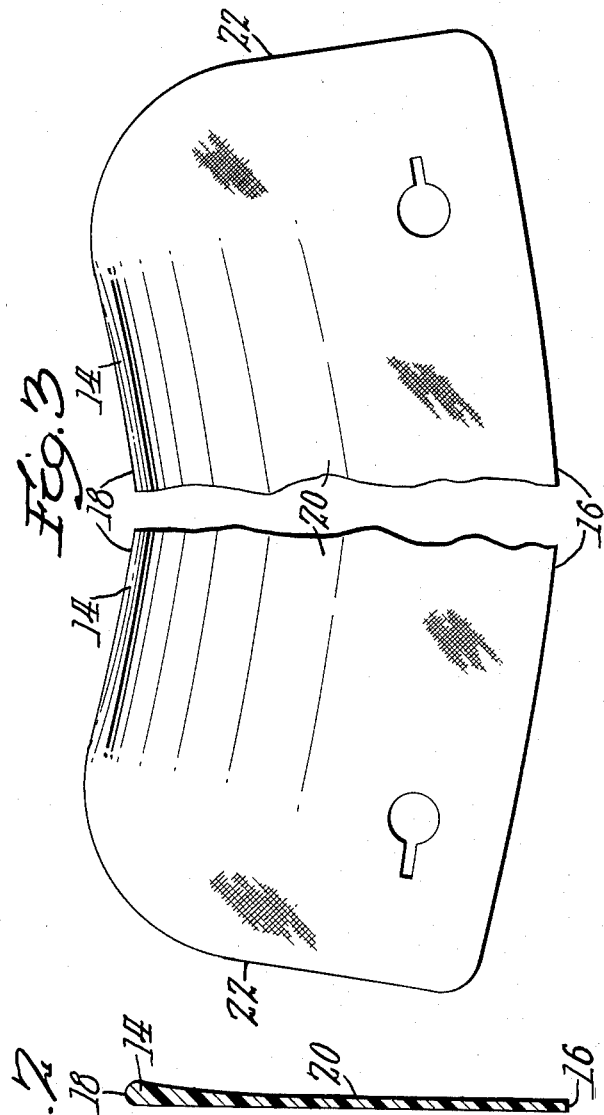
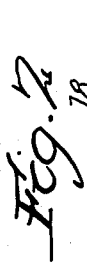
Inventors
John A. Toomey
Lawrence T. Toomey
By Charles R. Fay,
Attorney

United States Patent Office 3,206,763
Patented Sept. 21, 1965

3,206,763
COLLAR AND METHOD OF MAKING THE SAME
John A. Toomey and Lawrence T. Toomey, both of 75 Webster St., Worcester, Mass.
Filed Nov. 22, 1963, Ser. No. 325,654
3 Claims. (Cl. 2—129)

This invention relates to a new and improved molded plastic collar of the single fold type and the invention contemplates the provision of an easily cleaned molded plastic collar of conventional outline but having an upper edge and a lower edge, the upper edge having a portion thicker than the lower edge, the extreme edge of the thickened upper edge portion being rounded for improved comfort to the user of the collar.

Plastic collars have been made heretofore by cutting them out from sheets of plastic material and such prior art collars are of course uniform in thickness throughout, having square cut edges the upper one of which is uncomfortable to the user, whereas the molded plastic collar of the present invention provides for a thickened edge portion having a rounded terminal edge, greatly improving the comfort and the appearance of the collar while losing none of the prior art advantages of good appearance, easy cleaning, etc.

Another object of the invention includes the provision of a method of making the collar above described by injection molding an elongated blank longer than any collar to be made, and having a width equal to the width of the widest collar to be made, said blank having the thickened edge portion and rounded edge above described. This blank is then die cut, forming a collar of less length than the blank and in some cases of less width, but always utilizing the rounded thickened edge portion of the blank for the upper edge of the collar, so that collars of many different sizes are quickly and easily die cut from the single blank, and only one size of blank need be molded to carry out the method utilized for making collars of many different sizes.

Other objects and advantages of the invention will appear hereinafter.

Reference is to be had to the accompanying drawings, in which:

FIG. 1 is a plan view showing the molded blank and in dotted lines illustration of various sizes of collars to be formed therefrom;

FIG. 2 is a greatly enlarged section on line 2—2 of FIG. 1, and

FIG. 3 is a view showing a collar according to the invention with parts broken away.

In carrying out the present invention, a single mold is made in which is injection molded the blank which is illustrated in FIG. 1. This blank is longitudinally arced and is of a general thickness commensurate with the degree of stiffness desired in the collar and it may be etched or sandblasted on either or both sides to imitate a linen collar or to avoid the highly shiny surface of an injection molded article. The blank is longer than any collar which is desired to be made and its width is equal to the width of the largest size of collar to be formed. The blank is generally indicated at 10 and it is provided at its ends 12, 12 with shapes for holding the same while the collars to be described are die cut therefrom.

The main characteristic of the blank is that it has one longitudinal edge 14 which is relatively thicker than the opposite longitudinal edge at 16. The edge 14 is concave longitudinally and is to form the upper edge of the collar. The extreme edge at 18 is molded in a rounded form (see particularly FIG. 2) and tapers down from the thickest portion to an area approximately from 20 to 16 in FIG. 2 of generally uniform thickness.

From this blank there may be a die cut different sizes and even styles of collars. As illustrated by the dotted lines 22 in FIG. 1, various lengths of collars may be cut but they always include the edge 18 for the upper edge of the collar, the lower edge of the collar being indicated in dotted lines at 24. Of course any length of collar may have a width up to the width of the blank so that the longest collar cut from the blank may be made with different widths if desired, and the same is true of all of the sizes of collars cut out. However, every collar includes the rounded edge portion 18 which is the upper edge of the collar which is close to and often engages the chin portion of the face of the user. Thus it will be seen that the thickened portion of the collar and the rounded edge 18 will provide for greatly improved comfort to the wearer of the collar.

If desired, the thickness of the thicker edge may taper down longitudinally toward the ends 12, 12 of the blank so as to provide for a somewhat greater flexibility at the ends of the collars. It is pointed out that the single fold collars to which this invention pertains are ordinarily used by clergymen, with the central portion of the collar in the front of the shirt. It is the central portion of course which contacts the flesh of the user and therefore tapering the thicker edge of the collar down toward the ends does not lessen the comfort of the collar, while leaving the central part stiff and of good appearance.

Having thus described our invention and the advantages thereof, we do not wish to be limited to the details herein disclosed, otherwise than as set forth in the claims, but what we claim is:

1. A plastic shirt collar comprising a single elongated sheet of plastic of semi-flexible nature including an upper edge and a lower edge, the portion of the sheet adjacent the upper edge being thicker than the lower edge for a relatively short distance inwardly from the upper edge, and the upper edge being rounded, the sheet graduallly tapering down from a maximum thickness dimension at the upper edge to a generally uniform thickness dimension at a longitudinal line intermediate the edges, and having said uniform thickness dimension to the lower edge of the sheet, the sheet being singly ply throughout its entire extent and having uninterrupted smooth surfaces.

2. The collar of claim 1 including button-holes adjacent the lower edge of the collar in the thin portion thereof.

3. The method of making plastic collars each having a thicker rounded edge and an opposite thinner edge which includes molding an elongated plastic blank to a rounded, thick edge and a spaced thinner edge, die-cutting a collar from the blank of less width and of less length than the blank but including the rounded edge so that the collar has one rounded edge bordering the relatively thicker edge portion, and an opposite relatively thinner edge portion that is substantially square cut.

References Cited by the Examiner

UNITED STATES PATENTS

| | | | |
|---|---|---|---|
| 419,259 | 1/90 | Hyatt | 2—135 |
| 1,267,394 | 5/18 | Ferguson | 2—60 |
| 2,633,576 | 4/53 | Powers et al. | 2—129 X |
| 2,686,745 | 8/54 | De Matteo | 2—338 X |
| 2,875,446 | 3/59 | Snincak | 2—129 |
| 3,022,514 | 2/62 | Kaiser | 2—60 |

JORDAN FRANKLIN, Primary Examiner.